(12) United States Patent
Golbourn et al.

(10) Patent No.: US 9,152,463 B2
(45) Date of Patent: Oct. 6, 2015

(54) ELECTRONIC DATA STORE

(75) Inventors: Darren Golbourn, Southampton (GB); Tim Courtney, Coleraine (GB)

(73) Assignee: XYRATEX TECHNOLOGY LIMITED—A SEAGATE COMPANY, Havant (GB)

(*) Notice: Subject to any disclaimer, the term of this patent is extended or adjusted under 35 U.S.C. 154(b) by 826 days.

(21) Appl. No.: 12/829,295

(22) Filed: Jul. 1, 2010

(65) Prior Publication Data

US 2011/0178790 A1 Jul. 21, 2011
US 2011/0313752 A2 Dec. 22, 2011

Related U.S. Application Data

(60) Provisional application No. 61/296,641, filed on Jan. 20, 2010.

(51) Int. Cl.
| | |
|---|---|
| G06F 15/16 | (2006.01) |
| G06F 9/50 | (2006.01) |
| H04L 29/08 | (2006.01) |
| H04L 12/24 | (2006.01) |
| H04L 29/06 | (2006.01) |
| H04L 12/26 | (2006.01) |
| H04L 12/10 | (2006.01) |

(52) U.S. Cl.
CPC .......... *G06F 9/5011* (2013.01); *G06F 2209/501* (2013.01); *H04L 12/10* (2013.01); *H04L 29/08* (2013.01); *H04L 41/5003* (2013.01); *H04L 43/08* (2013.01); *H04L 65/80* (2013.01); *H04L 67/1008* (2013.01); *H04L 67/1097* (2013.01)

(58) Field of Classification Search
CPC .......... H04L 29/08549; H04L 29/08702; H04L 41/069; H04L 67/1097; H04L 67/1008; H04L 41/5003; H04L 65/80; H04L 43/08

USPC .......................................... 709/227
See application file for complete search history.

(56) References Cited

U.S. PATENT DOCUMENTS

| | | | | |
|---|---|---|---|---|
| 7,539,754 | B2 * | 5/2009 | Chambliss et al. | 709/224 |
| 7,693,970 | B2 * | 4/2010 | Eidler et al. | 709/223 |
| 7,970,902 | B2 * | 6/2011 | Rolia et al. | 709/226 |
| 8,126,914 | B2 * | 2/2012 | Tate et al. | 707/781 |

(Continued)

OTHER PUBLICATIONS

Sandeep Uttamchandani et al, "Chameleon: a self-evolving, fully-adaptive resource arbitrator for storage systems," USENIX Annual Technical Conference, USENIX Association, pp. 75-88 (Apr. 2005).

(Continued)

*Primary Examiner* — John Breene
*Assistant Examiner* — Eyob Hagos
(74) *Attorney, Agent, or Firm* — Hollingsworth Davis, LLC

(57) ABSTRACT

An apparatus and method of providing conditional access to an electronic data store including a storage controller and a data storage resource. The method includes receiving, at the storage controller, a network request for access to the data storage resource from a client, the request including at least one required parameter defining the requested connection, obtaining information on the performance of the data storage resource, determining, based upon the information, whether a) the data storage resource can meet the or each required parameter of the request; and b) meeting the or each required parameter of the request will not violate any previously agreed parameters defining existing connections on the data storage resource; and denying the request if at least one of a) and b) are determined to be negative.

20 Claims, 10 Drawing Sheets

(56) References Cited

U.S. PATENT DOCUMENTS

| | | | |
|---|---|---|---|
| 8,131,784 B1* | 3/2012 | Zhuge et al. | 707/823 |
| 8,209,272 B2* | 6/2012 | Little | 706/19 |
| 2003/0217245 A1* | 11/2003 | Chase et al. | 711/170 |
| 2004/0025162 A1* | 2/2004 | Fisk | 718/105 |
| 2006/0129771 A1* | 6/2006 | Dasgupta et al. | 711/162 |
| 2006/0218127 A1* | 9/2006 | Tate et al. | 707/3 |
| 2009/0125631 A1* | 5/2009 | Blom et al. | 709/228 |
| 2009/0213871 A1* | 8/2009 | Carlson et al. | 370/462 |
| 2010/0319004 A1* | 12/2010 | Hudson et al. | 719/313 |
| 2011/0035248 A1* | 2/2011 | Juillard | 705/8 |

OTHER PUBLICATIONS

Sandeep Uttamchandani et al., Polus: Growing Storage QoS Management Beyond a "Four-year Old Kid," USENIX Conference on File and Storage Technologies (FAST '04), 14 pages, 2004.

Chris Ruemmler et al., "An introduction to disk drive modeling," IEEE Computer. vol. 27, No. 3:17-29, pp. 1-17 (Mar. 1994).

* cited by examiner

ELECTRONIC DATA STORE

CROSS REFERENCE TO RELATED APPLICATIONS

This application claims priority and benefit under 35 U.S.C. §119(e) to U.S. Provisional Patent Application No. 61/296,641, entitled "Electronic Data Store", filed on Jan. 20, 2010. The content of that application is incorporated herein in its entirety by reference.

The research leading to these results has received funding from the European Community's Seventh Framework Programme (FP7/2007-2013) under grant agreement n° 214777.

The present invention relates to a method of providing conditional access to a networked electronic data store and a controller for controlling an electronic data store.

Traditionally, electronic data is stored locally on a user's computer system by means of a data storage resource such as a hard disk drive (HDD) or other storage media. However, the increasing prevalence of data-heavy resources (for example, real-time high definition video) has led to an increased demand for storage capacity.

An increasingly popular area is what is known as "cloud computing". Cloud computing provides a set of scalable and often virtual resources over a network such as an Ethernet or the Internet. A "cloud" comprises a consolidated storage system having large storage capacity (typically at the multi-petabyte level) which may serve independent customers (e.g. the cloud acts a storage service provider) or business units within an organisation (e.g. the cloud acts as a common corporate data store). In essence, cloud architecture means that the users generally do not own the physical computing resources they use and, instead, purchase usage from a third-party provider in a service-orientated architecture, or access a common corporate data store.

"Cloud"-type storage service providers are attractive to small to medium sized enterprises which do not typically have the resources to invest in over-provisioned storage infrastructures which will never be used efficiently. Storage service providers offer such users access to the storage services that they require without the need for capital expenditure on hardware and software solutions. In addition, the cost of hardware is becoming increasingly small in comparison to the cost of maintaining and managing a data storage resource. Therefore, this makes the "cloud" approach even more attractive to businesses. In many cases, service providers provide services in the manner of a utility service and billed, for example, on the basis of the resources consumed by the user or on a periodical billing basis.

It is known for the provision of services by a service provider to be covered by service level agreements (SLAs). An SLA is a negotiated agreement between a service provider offering a service and a client requiring use of the service. The SLA records a common agreement regarding the quality of service (QoS) to be delivered to the client. For example, in the field of data storage provision, the QoS may relate to minimum levels of (for example) performance, reliability, storage capacity, data bandwidth or read/write latency which can be guaranteed by the service provider. These factors form part of the QoS guaranteed to the client as part of an SLA. Therefore, when a user service provider enters into an SLA with a client, it is important that the service provider has the resources necessary to provide the specified level or type of QoS forming part of that SLA, i.e. that the service provider can meet the standards of service demanded by the client as defined in the SLA.

Currently, requests for access to a data storage resource are accepted without any knowledge of the current status or capabilities of the storage system. However, the performance of a given data storage resource is heavily dependent upon the demands placed upon it. For example, if a number of users are using a large proportion of bandwidth of the data storage resource (possibly in excess of that agreed for their respective SLAs), then the service provider may not be able to meet the required QoS for the new SLA.

Typically, because real-time data relating to the data storage resource is not available, the only way to circumvent this problem is to heavily over-provision the data storage resource, i.e. to have sufficient available capability to ensure that the QoS standards are met. However, this approach is wasteful of resources and uneconomical because a significant proportion of the data storage resource must be kept free for use during abnormally heavy traffic conditions, and so is rarely used. Consequently, existing service-orientated storage providers can only guard against "worst case" scenarios of abnormally heavy load.

Therefore, known storage provision arrangements suffer from a technical problem that current and predicted storage resource information cannot be easily obtained. This means that real-time conditional QoS guarantees on storage resource access cannot be made.

The paper "CHAMELEON: a self-evolving, fully-adaptive resource arbitrator for storage systems", S. Uttamchandani et al, USENIX Technical Conference, Anaheim, Calif., (April, 2005) discloses an alternative approach, in which connections which are exceeding their agreed SLA are rate-limited or "throttled". Consequently, this ensures a more fair distribution of resources between user connections so that the QoS is deferred equally amongst the connections. However, data storage resources are increasingly used for data transfers that require a minimum constant data bandwidth, such as the streaming of video content. The throttling of connections equally in time of high demand may not be appropriate in these circumstances.

A similar approach, albeit from a QoS perspective, is disclosed in "Polus: Growing storage QoS management beyond "A four-year old kid"", S. Uttamchandani et a,l USENIX Conference on File and Storage Technologies (FAST '04), 2004. This document discloses an arrangement whereby the need for system administrators to write code that maps QoS goals to low level system actions within a storage area network (SAN).

Alternatively, hard drives can be modelled at the internal component level as disclosed in "An introduction to disk drive modelling", C. Ruemmler and J. Wilkes, IEEE Computer 27 (3): 17-29, March 1994. However, such modelling is heavily resource-intensive and cannot be performed in real-time.

It is currently difficult to model the real-time current and future storage performance of a data store in order to address the technical limitations of current systems for managing storage. Modelling of a data store (which consists of multiple connections accessing data across a set of many drives all of which may be in different states) in order to provide real-time and QoS is extremely processor-intensive and requires significant computing power. This means that such an intensive modelling process cannot be carried out efficiently in real-time.

According to a first aspect of the present invention, there is provided a method of providing conditional access to a networked electronic data store comprising a storage controller and a data storage resource, the method comprising:

receiving, at the storage controller, a network request for connection to the data storage resource from a client computer, said request comprising at least one required parameter defining the requested connection;
obtaining performance information on the data storage resource;
determining, based upon said performance information, whether:
  a) the data storage resource can meet the or each required parameter of the request; and
  b) meeting the or each required parameter of the request will not violate any previously agreed parameters defining existing connections on the data storage resource; and
denying the request if at least one of a) and b) are determined to be negative.

By providing such a method, new requests (for example, SLAs) will only be accepted if there is sufficient current and future capacity to meet the requirements of the request. Therefore, a particular level of QoS can be better guaranteed by avoiding any undesirable interaction between a new request and existing connection requests that may result in breaking previously agreed standards of QoS. Further, the service does not need to be over-provisioned because the storage controller has knowledge of the current usage and capacity of the data storage resource, and so can simply refuse any connections having minimum QoS requirements which the storage resource cannot meet.

The inventors have recognised an advantage in providing real-time guarantees on the quality of service for data storage resource access. This is achieved by a conditional access arrangement whereby SLAs are only granted access with the knowledge that sufficient capacity exists for that SLA on the data storage resource. This enables the data storage resource to be more efficiently utilised and to achieve improved QoS levels, because there is no need to, for example, rate-limit connections.

In embodiments, a method and apparatus is provided which enables improved conditional access to an electronic data store. It is a further object of some aspects of the present invention to provide a method and apparatus for improved conditional access to an electronic data store utilising real-time information relating to the current and predicted utilisation of the data storage resource.

In one example, the network request is a service level agreement comprising said required parameters of the requested connection. A service level agreement is a convenient way to specify the requirements of a desired connection.

In a further example, said previously agreed parameters form part of previously agreed service level agreements defining each existing connection. A service level agreement is a convenient way to specify the requirements of a desired connection.

In one variation, the parameters of the or each service level agreement comprise quality of service parameters. QoS is an important aspect of a service, defining minimum levels of service that will be provided to a client computer. In a further variation, the quality of service parameters comprise at least one of: storage capacity; bandwidth; latency or the type of data access.

In one example, the determining step a) further includes comparing parameter data on previously agreed service level agreements on the storage device with the required parameters of the requested service level agreement from the client computer. Previously agreed service level agreements provide information on the type of requests that can be handled by the storage resource.

In another example, the determining step a) further includes determining whether the required parameters fall within a range defined by the parameter data of existing service level agreements on the data storage device. By defining a range of SLAs which could be accepted, if a requested SLA falls within this range, then the storage controller can determine that the storage resource is in principle able to meet that request In a further example, the determining step b) comprises determining, based on said performance data, the predicted available resources of the storage resource and determining whether the resources are sufficient to meet the required parameters of the service level agreement. By predicting the available resources based on current performance data, the storage controller can determine whether a newly requested SLA can be met once it is granted access to the system.

In one approach, said performance information comprises data generated from a predictive model.

In a variation, the predictive model uses heuristic methods. These methods enable a model to be run in a processor and memory efficient manner, enabling rapid refreshing of the model data. In a further variation, said model is operable to generate said performance information in real-time.

In one arrangement, the data storage resource comprises at least one data storage component, the or each data storage component comprising readable and writeable data storage media. More particularly, the or each storage component comprises a plurality of networked data storage devices in a RAID arrangement.

According to a second aspect of the present invention, there is provided a controller for controlling access to an electronic data store, the electronic data store comprising a data storage resource to which, in use, the controller is operable to be connected, the controller being operable to: receive network requests for access to a data storage resource from a client computer, said network request comprising at least one required parameter defining the requested connection; obtain information on the status of a data storage resource; and determine from said information, whether:
  a) a data storage resource can meet the or each required parameter of the request; and
  b) meeting the or each required parameter of the request will not violate any previously agreed parameters defining existing connections on a data storage resource;
the controller being further operable to deny the request if at least one of a) and b) are determined to be negative.

By providing such an arrangement, new requests (for example, SLAs) will only be accepted if there is sufficient capacity to meet the requirements of the request. Therefore, a particular level of QoS can be better, guaranteed by avoiding any undesirable interaction between a new request and existing connection requests that may result in breaking agreed standards of QoS. Further, the service does not need to be over-provisioned because the storage controller has knowledge of the current usage and capacity of the data storage resource.

In one example, the network request is a service level agreement comprising said required parameters of the requested connection. A service level agreement is a convenient way to specify the requirements of a desired connection.

In a further example, said previously agreed parameters form part of previously agreed service level agreements defining each existing connection. A service level agreement is a convenient way to specify the requirements of a desired connection.

In one variation, the parameters of the or each service level agreement comprise quality of service parameters. QoS is an important aspect of a service, defining minimum levels of service that will be provided to a client computer. In a further variation, the quality of service parameters comprise at least one of: storage capacity; bandwidth; latency or the type of data access.

In one example, the controller is further operable to compare parameter data on previously agreed service level agreements on a data storage resource with the required parameters of the requested service level agreement from a client computer in order to determine whether a data storage resource can meet the or each required parameter of the request.

In a further example, the controller is further operable to determine whether the required parameters fall within a range defined by the parameter data of existing service level agreements on a data storage resource.

In one example, the controller is further operable to determine, based on said performance data, the predicted available resources of a storage resource and determining whether the resources are sufficient to meet the required parameters of the service level agreement.

In a variation, said performance information comprises data generated from a predictive model. In a further variation, the predictive model uses heuristic methods. In a yet further variation, said model is operable to generate said performance information in real-time.

In one arrangement, the electronic data store comprises a data storage resource and the controller. The controller may form a part of the electronic data store, or may be provided to an end user in the form of a separate component, e.g. a server which is then attached to an existing data store.

In one arrangement, the data storage resource comprises at least one data storage component, the or each data storage component comprising at least one data storage device.

In a further arrangement, each data storage component comprises a plurality of networked data storage devices in a RAID arrangement.

In a variation, the controller is integrated with the data storage resource. The controller could, for example, form a part of the storage resource as an in-built hardware controller.

According to a third aspect of the invention, there is provided a computer program product executable by a programmable processing apparatus, comprising one or more software portions for performing the method of the first aspect of the invention.

According to fourth aspect of the invention, there is provided a computer usable storage medium having a computer program product according to the third aspect of the invention stored thereon.

Embodiments of the present invention will now be described in detail with reference to the accompanying drawings, in which.

Figure 1:
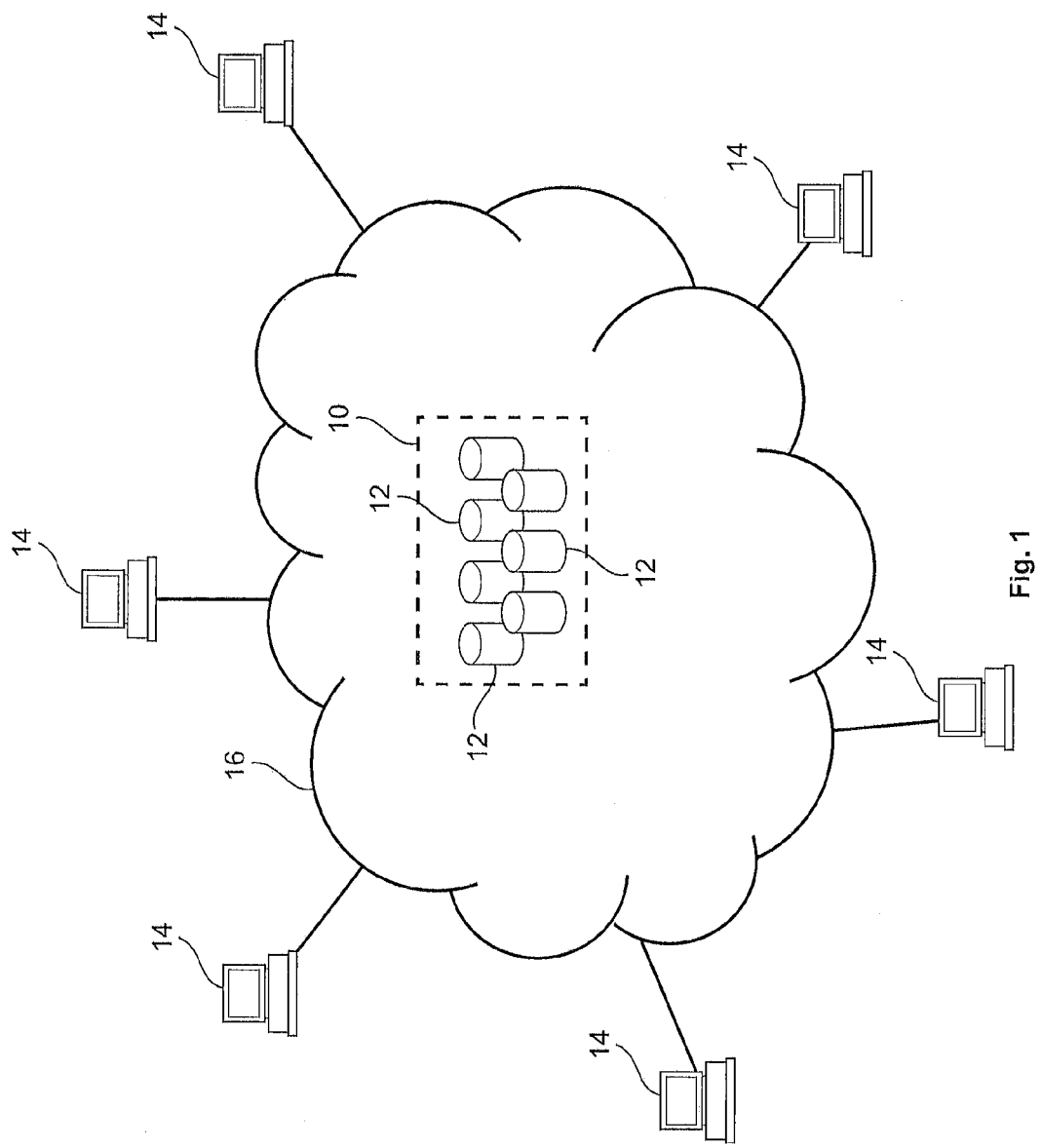
FIG. 1 is a schematic diagram of a cloud network.

FIG. 1 shows a schematic illustration of an environment in which the present invention may be used. An electronic data store 10 is provided by a service provider. The data store 10 comprises a plurality of storage units 12. Each storage unit may take the form of, for example, an individual hard drive or a collection of hard disk drives (HDDs) linked together through a protocol such as Redundant Array of Inexpensive Disks (RAID) to form a logical unit. Alternatively, other suitable protocols may be used. However, irrespective of the number or configuration of HDDs present, the data store 10 is presented to a client computer as a single data store.

A plurality of client computers 14 connect to the data store 10 through a cloud network 16. The cloud network 16 may take a number of forms, for example, an internet network, a cable network or a mobile network. The cloud network 16 enables each user of each client computer 14 to read data from, or write data to, the data store 10 as if the data was stored locally. Each client computer 14 has an SLA with the service provider of the data store 10 which specifies the QoS required by the user of the client computer 14 whilst connected to the data store 10. For example, the SLA might specify the type of data access required (e.g. random or sequential) and/or the bandwidth/latency requirements of the access required to, or the retrieval required from, the data store 10. However, these examples are non-limiting and other parameters may be utilised.

Figure 2:
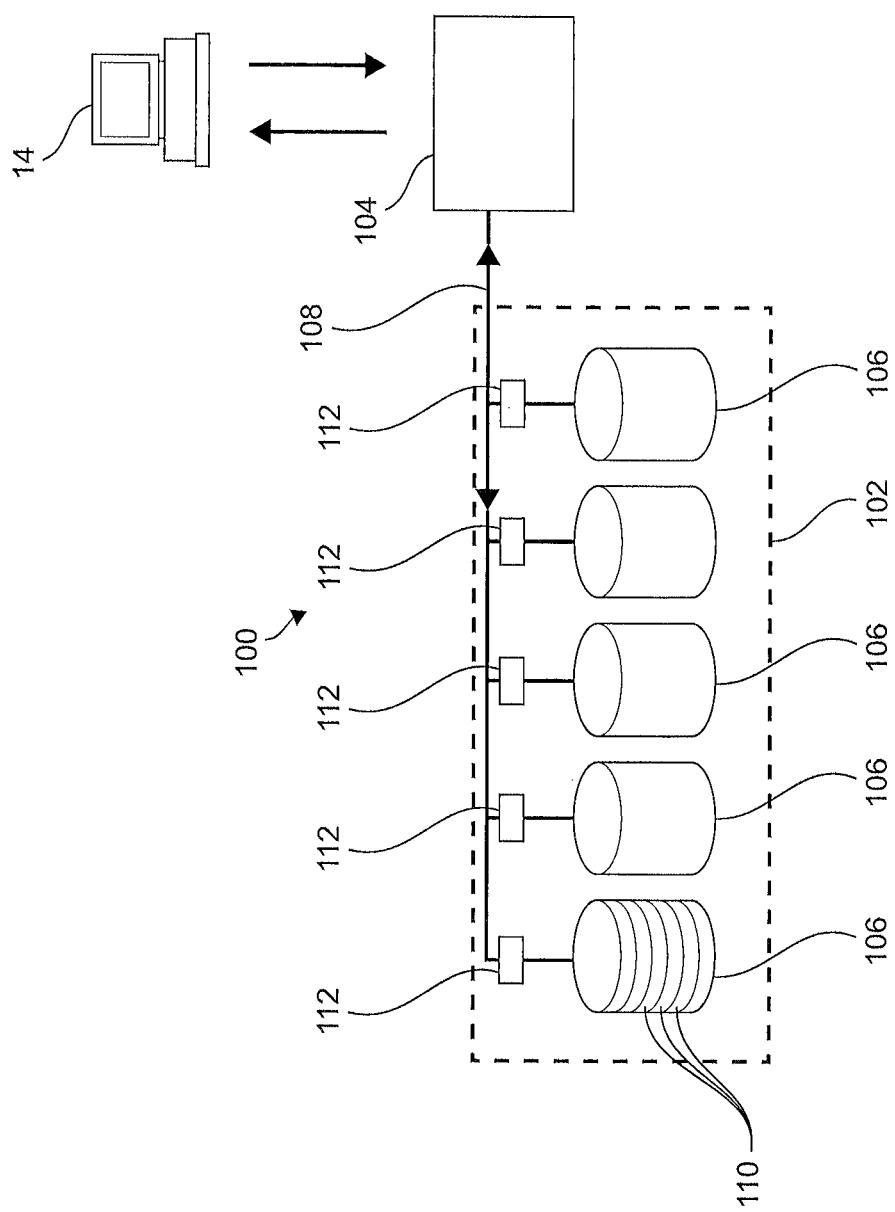
FIG. 2 is a schematic diagram of an embodiment of an electronic data store.

FIG. 2 shows an electronic data store 100. The electronic data store 100 comprises a data storage resource 102 and a storage controller 104.

The data storage resource 102 comprises a plurality of data storage components 106 connected together over a storage network 108. In this embodiment, each data storage component 106 comprises a group of approximately five to eight physical drives 110 linked together via a RAID controller 112. Note that, for clarity, only the physical drives 110 of one storage component 106 are shown in FIG. 2.

The physical drives 110 may take any form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device. Further, a physical drive 110 may take the form of a single partition on a hard disk drive. Therefore, a single hard disk drive may comprise a plurality of physical drives 110 in the context of the electronic data store 100.

The RAID controllers 112 are representative of any storage controller devices that process commands from the storage controller 104 and, based on those commands, control the physical drives 110 forming part of each respective storage component 106. RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth. Additionally, each storage component 106 comprising a RAID array of drives 110 appears to the storage controller 104 as a single logical storage unit (LSU) or drive.

The RAID controllers 112 also provide data redundancy. The RAID controllers 112 provide data integrity through a built-in redundancy which includes data mirroring, parity generation, and/or data regeneration from parity after a drive failure. Parity and other error correcting codes are either stored on one or more drives 110 solely dedicated for that purpose or are distributed over all the drives 110 in the array.

Data interleaving is usually in the form of data "striping" in which the data to be stored is broken down into blocks called "stripe units". The "stripe units" are then distributed across the physical drives 110. Therefore, the RAID controllers 112 are arranged such that, should one of the physical drives 110 in a group forming a storage component 106 fail or become corrupted, the missing data can be recreated from the data on the other drives 110. The data may be reconstructed through the use of the redundant "stripe units" stored on the remaining physical drives 110.

In the case of a disk rebuild operation, this data is written to a new replacement physical drive 110 that is designated by the storage controller 104. However, a period of time is required to rebuild the missing data onto the allocated physical drive 110. During this time the respective data storage component 106 may not be able to perform to normal levels or may not be able to read or write data at all for a relatively short period of time.

In addition, media errors may occur which result in a particular physical device 110 not being able to supply the requested data for a stripe unit on a physical drive 110 can occur. If a media error occurs during a logical drive rebuild (i.e. rebuild of a storage component 106), the physical drive 110 will be corrupted and the entire storage component 106 will go offline, losing all of the data stored thereon. To bring the logical drive back online, the service provider must replace the corrupted physical drive 110.

Whilst many RAID systems are fault tolerant to the extent that a damaged or corrupted physical drive 110 can simply be removed and replaced in a "hot swap" (i.e. without powering down the data storage component 106) this means that, for a period of time, the storage component 106 in question is not available for input/output access. This reduces the overall available capability that can be provided by the data store 100.

Figure 3:
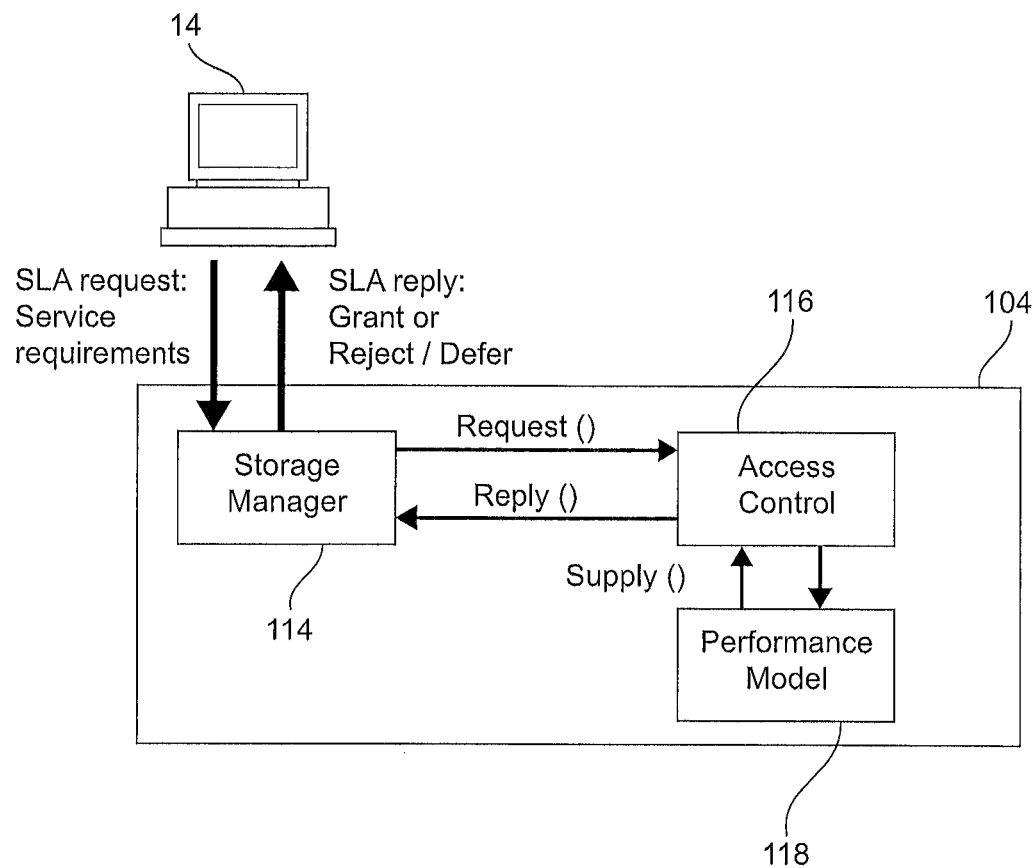
FIG. 3 is a schematic diagram showing the storage controller forming part of the electronic data store of FIG. 2 in more detail.

The storage controller 104 controls the flow of data into and out of the storage resource 102, and controls access to the storage resource 102 from client computers 14. The storage resource 102 is shown in more detail in FIG. 3. The storage controller 104 may take the form of, for example, one or more computer servers which may be provided separately from, or may form a part of, the storage resource 102.

The storage controller 104 comprises a storage manager 114, an access control block 116 and a performance modelling block 118. These features may be implemented in either a hardware layer, a software layer or a combination of both. The skilled person will be readily aware that the above features of the present embodiment could be implemented in a variety of suitable configurations and arrangements.

The storage manager 114 is configured to function as a portal for a client computer 14 and presents an interface for communication between a client computer 14 and the data storage resource 102. This may take the form of, for example, a webpage or a portal, or a native storage command data channel such as SCSI utilising, for example, suitable SCSI protocols to transmit data between the client computer 14 and data storage resource 102. The storage manager 114 is configured to receive SLA requests from a client computer 14 and to respond to the client computer 14 either granting or denying the client computer 14 access to the data storage resource 102. Additionally, the storage manager 114 is configured to access the data storage resource 102 to obtain actual real-time information on the performance of the data storage resource 102. This can be used to validate the predictive model used to grant or deny access to the storage resource. This will be described later. The access control block 116 is configured to receive SLA requests and their respective QoS requirements from the storage manager 114. The access control block 116 is further configured to receive performance information from the performance modelling block 118.

The access control block 116 is operable to use information from the storage manager 114 regarding SLAs requests and to determine, based on performance information from the performance modelling block 118, the current performance of the data storage resource 102. This information is used to determine whether the SLA request should be accepted or denied.

The performance modelling block 118 is operable to model the real-time operation of the data storage resource 102 and to provide the access control block 116 with real-time model information relating to the current and future configuration, performance and usage of the data storage resource 102. This will be described later in more detail.

Figure 4:
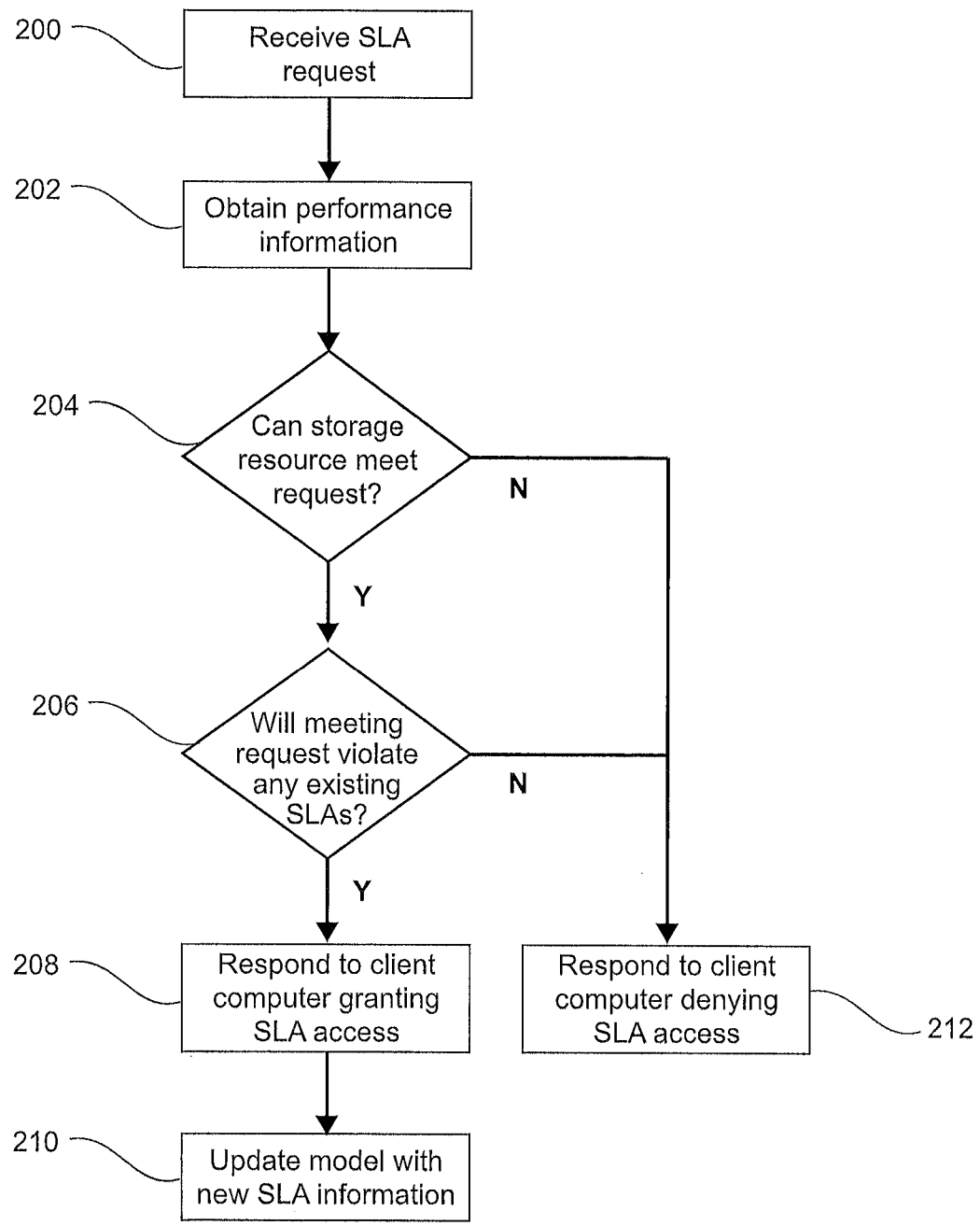
FIG. 4 is a flowchart illustrating the operation of the storage controller of FIG. 3.

The operation of the electronic data store 100 will now be described with reference to FIG. 4.

Step 200: Receiving an SLA Request

The process of granting conditional access to the electronic data store 100 begins when a client computer 14 sends an SLA request to the storage controller 104. A client computer 14 connects to the electronic data store 100 through an interface such as a webpage or portal held on the storage manager 114. The storage manager 114 receives an SLA request comprising a plurality of parameters relating to the QoS required by the client computer. The parameters may comprise one or more of the storage capabilities including, for example: storage capacity; bandwidth; latency or the type of data access (sequential or random). The SLA request, together with the requested parameters thereof, is then passed to the access control block 116. The method now proceeds to step 202.

Step 202: Obtaining Performance Information

The access control block 116 obtains performance information from storage manager 114 and the performance modelling block 118. The performance information comprises both real-time current data and a "best fit" modelling of the predicted status of the data storage resource 102 as received from the storage manager 114, preferably using heuristic rules. By this is meant that the performance modelling block 118 is configured to provide to the access control block 116 modelled real-time information on the predicted status of the storage resource, e.g. information such as predicted available bandwidth, predicted available storage capacity, latency and read/write access speeds. Such data cannot be obtained by directly modelling the data storage resource 102 without significant processing overhead. The method now proceeds to step 204.

Step 204: Determining Whether the Storage Resource can Meet the Requirements of the Request The access control block 116 has access to the current and predicted performance and capacity of the data storage resource 102 as modelled by the performance modelling block 118. The performance modelling block 118 has information on the connections which are currently operating between client computers and the data storage resource 102, or have been previously modelled. Therefore, by comparing the parameters of the SLAs currently on the system with the newly requested SLA, the performance modelling block 118 is able to determine whether a new SLA can be met by the data storage resource 102 independently of the current usage of the storage resource 102.

Therefore, the access control block 116 determines whether an incoming SLA request has parameters which fall within the range of parameters of SLAs defining connections already operating correctly on the data storage resource 102, or deemed to be operable correctly on the storage resource, i.e. whether the architecture of the data storage resource 102 has sufficient capacity to meet the requirements of the SLA.

If the determination is positive, i.e. the incoming SLA has requirements which fall within a range which is acceptable for correct operation on the data storage resource 102, then the method proceeds to step 206. Otherwise, if it is determined that the requirements of the SLA cannot be met by the data storage resource 102, then the method proceeds to step 212.

Step 206: Determining Whether Meeting the Requirements of the SLA Will Violate any Existing SLAs on the System The next stage is to determine whether accepting the SLA onto the data storage resource 102 will violate any existing SLAs. From the performance information received from the performance modelling block 118, the access control block 116 can determine whether sufficient capability currently exists, and is predicted to continue to exist, on the storage resource to meet the QoS requirements of the new SLA received from the client computer 14. The QoS requirements of the new SLA must be met without breaking any of the QoS requirements of the SLA for existing connections on the data storage resource 102.

If it is determined that sufficient capability exists on the storage resource to accommodate the requirements of the new SLA for the new connection with the client computer 14, then the determination is positive and the method proceeds to step 208.

However, if it is determined from the performance information that the data storage resource 102 has insufficient capability to meet the SLA requirements, or that the SLA requirements can only be met by violating any existing SLAs on the system (e.g. by rate-limiting other connections to a level below their agreed QoS), then the determination is negative and the method proceeds to step 212.

Step 208: Granting the SLA Request

When the determination from both steps 204 and 206 is positive, then the access control block 116 determines that the data storage resource 102 has sufficient capacity or resource to meet the requirements of the new SLA and the SLA can be granted.

The access control block 116 passes a grant command to the storage manager 114. The storage manager 114 then sends an SLA acceptance response to the client computer 14, which can then be connected to the data store 100 by the storage manager 114. The client computer 14 can then read data from, or write data to, the data storage resource 102 as if the data storage resource 102 was local to the client computer 14.

In one example, the storage controller 104 will allocate a particular data storage component 106 to the client computer 14 based upon the type of data or data access required. For example, if a particular data storage component 106 is used predominantly for the sequential access of large files (for example, streaming of video data), a newly granted request for such a type of data transfer may be allocated to the same data storage component 106. This improves the QoS because data which requires the same transfer conditions (for example, in the case of video, constant bandwidth is more important than latency) is grouped on the same data storage components 106. Alternatively, if a user of the client computer 14 requires random access (for example, data files such as spreadsheets), the client computer 14 may be allocated a different data storage component 106. The method then proceeds to step 210.

Step 210: Updating Model with New SLA Information

Once a new connection having a new SLA has been allowed onto the data storage resource 102, then this information is used by the performance modelling block 118 to update the model with the new SLA data. Therefore, when a subsequent SLA request is received by the storage manager 114, the current capacity of the data storage resource 102 is up to date, and the predicted available capacity can be determined more accurately.

Step 212: Denying the SLA Request

If either one (or both) of the determinations from steps 204 and 206 are negative, then the method proceeds to step 212 and the SLA request is denied. The access control block 116 determines that the data storage resource 102 has insufficient capacity or resource to meet the requirements of the newly requested SLA and/or that the newly requested SLA may cause a conflict with an existing SLA. Therefore, the requested SLA must be refused or deferred.

The access control block 116 passes a refuse command to the storage manager 114. The storage manager 114 then sends an SLA refusal response to the client computer 14, which is then informed by the storage manager 114 that the data store 100 is unable to meet the requirements of the SLA at this time.

Three possible outcomes may result from the SLA denial. In the most simplistic arrangement, the SLA is denied and the client computer 14 does not connect. Alternatively, the client computer 14 could be informed by the storage manager 114 that the data storage resource 102 cannot meet the requirements of the SLA at this time, and that the client computer 14 should attempt to connect at a later period. Alternatively, the client computer 14 could be offered a connection where the SLA requirements are lower. Thus, a possible negotiation phase could be initiated.

Figure 5:
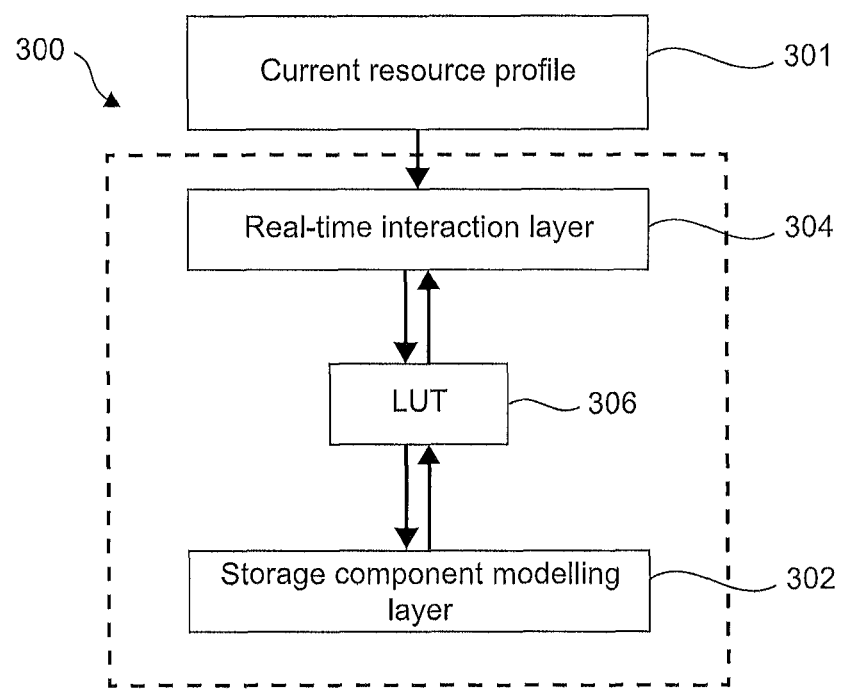
FIG. 5 is a schematic diagram of the components of a first version of a model suitable for use in a performance modelling unit forming part of the storage controller of FIG. 3.

The configuration of the performance modelling block 118 according to a first version will now be described. Referring to FIG. 5, the first version of the model 300 is suitable for use in the performance modelling unit 118. The model 300 is designed to predict ahead the performance of the storage resource 102 based on the current resource profile 301. The model 300 comprises a storage component layer 302 and a real-time interaction layer 304. The storage component layer 302 has a look up table (LUT) 306 which the real-time interaction layer 304 can access in use. These two layers will be described below.

i) Data Storage Component Modelling

The first layer of the model 300 is the storage component modelling layer 302. This stage of the model 300 is performed prior to the data store going live for access, i.e. before the electronic data store 100 accepts any SLAs or other requests for storage.

This process requires a potentially large overhead at initialisation. However, the advantages of this arrangement are that the processor- and time-intensive modelling task can be performed under non time-critical conditions prior to initialisation of the electronic data store 100.

The model 300 enables the task of modelling the complex series of interactions in an electronic data store 100 to be simplified. This is achieved by modelling the basic unit of benchmarking as individual modelled data storage components 308 which each represent an individual storage component 106 within the electronic data store 100. Therefore, for the purposes of the model 300, the smallest indivisible (or atomic) unit is a virtual storage component 308. Consequently, the modelled storage resource 310 is described in the model 300 as a collection of virtual storage components 308. This significantly reduces the calculations required when compared to the modelling of the entire electronic data store 100 and interactions therein.

Figure 6:
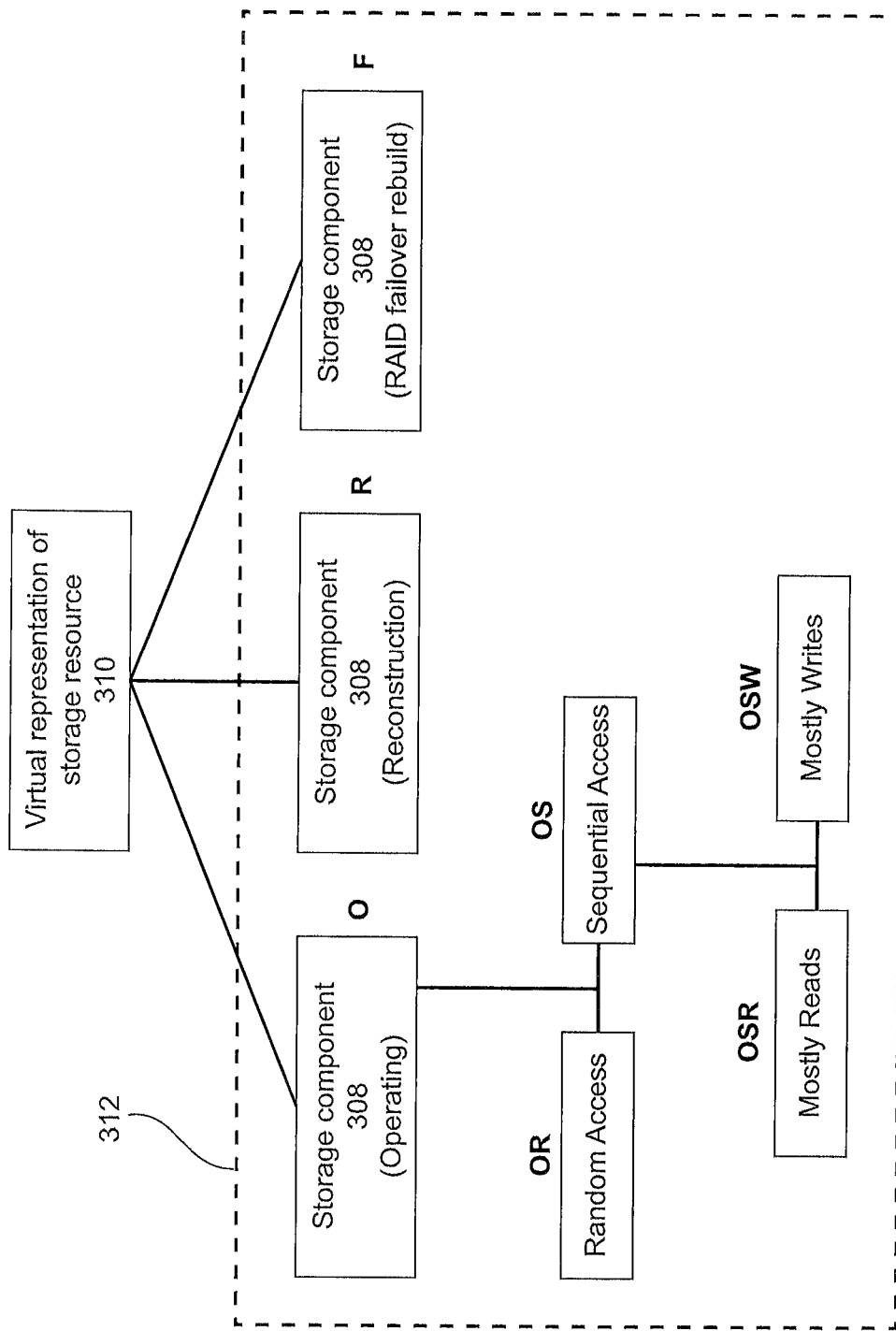
FIG. 6 is a schematic diagram of the first version of the model showing the component structure thereof.

For the purposes of the model 300, each virtual storage component 308 is deemed to have a limited number of operating states. This reduces the processing overheads and enables the model 300 to be run in real-time to model the behaviour of the actual storage components 106. FIG. 6 is a schematic illustration of the possible states of each virtual storage component 308. These form a "pool" of states 312 which can be accessed by the real-time interaction layer 304.

If a storage component 308 is operating, then the model 300 deems the storage component 308 to be operating in an optimal state. Therefore, the data component model 300 has only a single operation state, and factors such as performance degradation after benchmarking due to use, age or other factors are not considered. Consequently, if a given storage component 106 is deemed to be operating, it is given state O.

If the virtual storage component 308 is operating in state O, it can have a number of dynamically-assignable operating states, based on the type of access taking place. Each virtual storage component 308 is considered to be accessed in either random access mode (state OR) which may occur when, for example, a connection is accessing spreadsheet data files, or sequential access mode (state OS) which may occur when, for example, a connection is streaming video. Since there may be significant differences in system performance depending upon whether data is being sequentially read or written, there are two further states in which mostly sequential reading (state OSR) or mostly sequential writing (state OSW) is occurring.

Each virtual storage component 308 is also considered to be a temporary entity corresponding to the actual data storage component 106 in a particular state. The virtual storage component 308 can be removed from the model 300 of the storage resource 310 if, for example, a data storage component 106 changes its state, e.g. by changing its behaviour due to corruption or failure.

Following the corruption of a physical drive 110 in a RAID array forming a single data storage component 106, the corrupted physical drive 116 is replaced and each hard disk drive in a RAID array forming a data storage component 106 is involved in the reconstruction of the missing data and is not available for data transfers. Therefore, the equivalent virtual storage component 308 would be allocated a state R (for reconstruction) or F (for RAID failover). A virtual storage component 308 in either of these states is simply removed from the model and a new component added when the drive is reconstructed.

By providing such a model with a limited number of possible states for each modelled virtual storage component 308, an expensive processing and modelling overhead of describing complex internal interactions within actual storage components 106 can be avoided. The storage component layer 302 of the model 300 provides a method of separating the storage resource 102 into dynamically assignable objects (i.e. virtual storage components 308) assigned from a pool 312 of pre-built data storage component states or classes (O, R or F). Further, for example, within the "operating" class O, there may be a number of states O, OR, OS, OSW and OSR.

Therefore, the predicted capacity and performance of the storage resource 102 can be determined from the current resource profile accurately, in real-time and without excessive processor overhead.

In order to provide meaningful parameters to represent the model 300, the various states for each virtual storage component 308 are benchmarked to obtain actual system performance data for use by the real-time interaction model. Consequently, the states O, OR, OS, OSW and OSR within the "operating" class, and states or classes F and R are benchmarked to obtain actual values from the system on which the model will be operating in use. Once the benchmarking has been carried out, the results of the various benchmarks can be stored in the LUT 306 for access by the real-time interaction layer 304 of the model.

ii) Real-Time Interaction Layer

The real-time interaction layer 304 is in the form of a software mediation layer which dynamically combines the data from the storage component layer 302 in order to best match the current resource profile in the storage resource 102. This data is used to predict ahead the capacity and performance of the storage resource 102. The interaction layer 304 is based on metrics computed from the prior-allocated data storage component LUT 306. It uses as an input the results output from the storage component later 302.

If the state of one of the components change (for example, a disk failure or rebuild), then the short-lived virtual storage component 308 is discarded back to the pool 312 of virtual storage components 308 and replaced with a more suitable one.

The interaction model takes into account the number of connections and the data transfer rates of each connection in order to provide an estimate of the non-linear aggregate performance of the data storage components 106. It also uses quickly determined access data, or recent access data, to guess ahead the current access profile to choose a set of storage components from the look up table 306.

The interactions between data users and the virtual storage components 308 can be modelled on heuristic rules. For example, modelling of sequential access for more than one user can cause an increase in processing overheads. Therefore, an approximation may be used; for example, data storage component 1 being sequentially read from both client computer 1 and from client computer 2 could be approximated as a random read from users 1 and 2. This type of approximation reduces the processing overhead and allows improved real-time data acquisition and usage prediction. In other words, the model chooses to transition access states (e.g. from sequential 208 to random 206) rather than perform a more detailed analysis. This transition between static states based on rules mitigates the performance modelling overhead.

Alternatively, more detailed analysis may also be performed to describe transitions. The model could predict read rates and approximate a general read rate for each device. For example, data storage component 1 being sequentially read from client computer 1 at data rate A, and from client computer 2 at data rate B could be approximated as a random read from users 1 and 2 at a data rate of some function of rates A and/or B.

Figure 7:
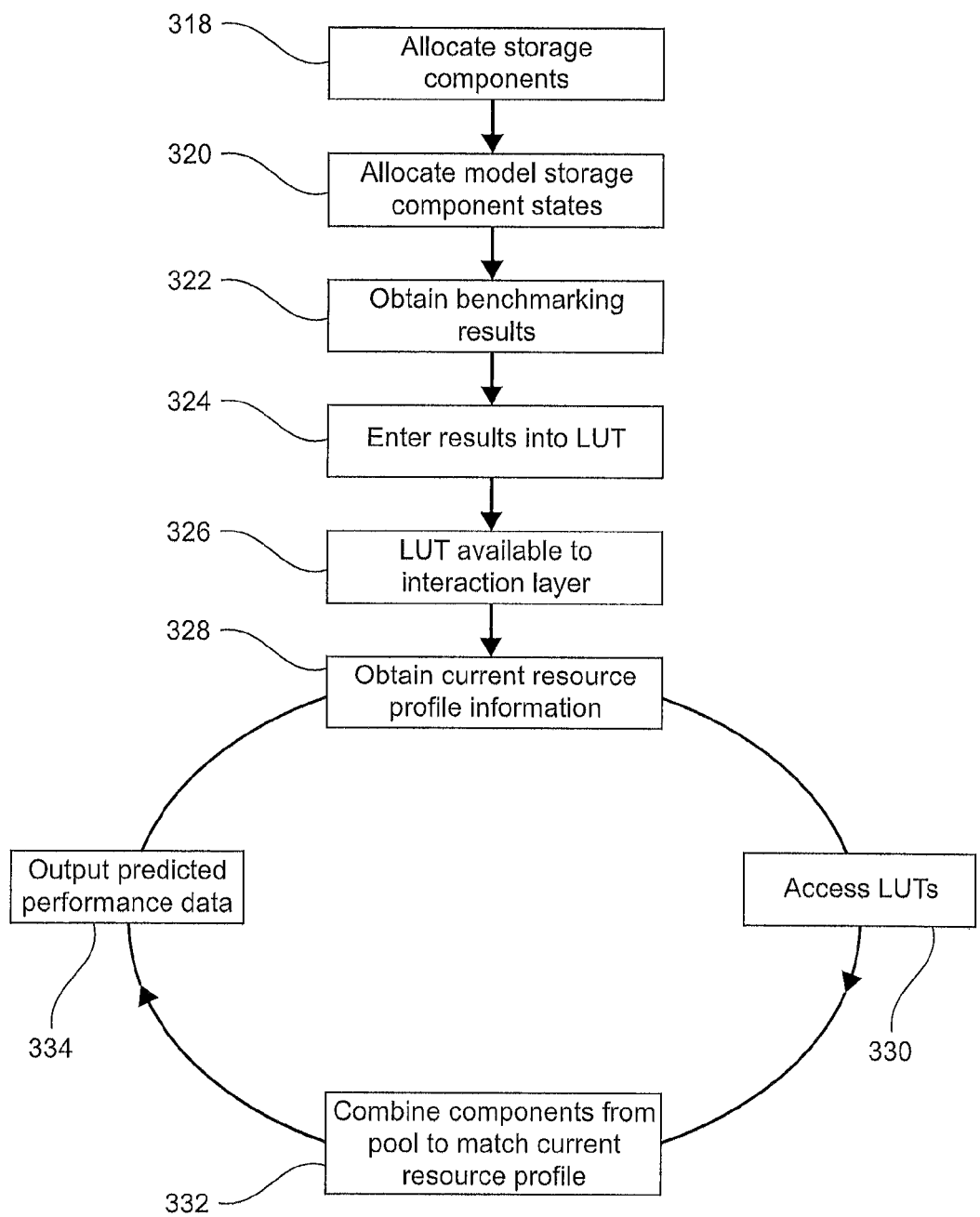
FIG. 7 is a flowchart illustrating the operation of the first version of the model.

With reference to FIG. 7, the operation of the model 300 according to a first version will now be described.

Step 318: Allocate Storage Components

The first step is to break down the data storage resource 102 into a plurality of virtual storage components 308 which can be dynamically combined to represent the actual data storage resource 102. In this example, each virtual storage component 308 is selected to correspond to a single actual storage component 106, i.e. a single physical drive. However, this may not be the case and each virtual storage component 308 may represent more than one physical drive or may represent an individual hard drive 110 within a storage component 106.

Step 320: Allocate Model Storage Components States

The next step is to determine the pool of model states O, OR, OS, OSW, OSR, R and F as described above which will describe the virtual storage components 308 representing the actual storage components 106. The method then proceeds to step 322.

Step 322: Obtain Benchmarking Results

The benchmarking is carried out on a set of bare storage components 106, i.e. the storage components 106 which will form the actual storage resource 102 on which the model 300 will be run on. A variety of benchmarking tests (i.e. performance tests on a physical system) are performed to measure data parameters such as: read bandwidth, write bandwidth, storage capacity, and latency. The performance of each storage component in response to different types of data read/write will also be benchmarked. For example, a storage component 106 may perform differently when reading or writing sequential data (such as a video file) when compared to reading or writing random data (such as spreadsheet data). Therefore, each storage component 106 is benchmarked for random access OR and sequential access OS. Due to the system resources consumed during sequential accesses, the sequential access model OS is benchmarked for two parameters—mostly reads OSR and mostly writes OSW. The method then proceeds to step 324.

Step 324: Enter Results into LUT

The benchmarking results are stored with respect to the benchmarks corresponding to each model state. A LUT is a convenient way to store this data representing the pool 312 of possible states of each storage component 106. The method then proceeds to step 326.

Step 326: LUT Available to Interaction Layer

Once the LUT has been tabulated and the pool of components defined, this information can be used by the second layer, i.e. the real-time interaction layer 304 of the model. The storage component layer 302 has now finished, and the method then proceeds to step 328 which is the start of the operation of the real-time interaction layer 304.

Step 328: Obtain Current Resource Profile Information

The real-time interaction layer 304 obtains current resource profile information from the storage manager 106 when the data store 100 is in operation. This information includes current usage on the resource (i.e. accesses to the data storage resource 102) and details of SLAs currently on the system. The method then proceeds to step 330.

Step 330: Access LUTs

The real-time interaction layer 304 then accesses the data stored in the LUTs and moves to step 332.

Step 332: Combine Components from Pool to Match Current Resource Profile

The real-time interaction layer 304 attempts to combine the components from the pool by using data stored in the LUTs in order to match the current resource profile. This happens in real-time and so is able to account for sudden variations in the storage resource 102; for example, in the event of a drive failure. The model 300 then moves to step 334.

Step 334: Output Predicted Performance Data

Once the current resource profile has been modelled by combining components from the pool (and using data from the LUTs), the real-time interaction layer has built a picture of the current storage resource performance which can be used to predict ahead. This data is output in this stage to the access controller 116 such that the performance information can be used to grant or to deny the respective client computer 14 access to the storage resource 102.

The method then proceeds back to step 328 and continues in a loop, providing updated, real-time modelling of the storage configuration of the storage resource 102. In this way, reliable predictions of the future behaviour of the storage resource 102 can be made without excessive processing overhead.

A final, implicit, stage is the validation of the component interaction model. This can be measured against real-time benchmarks that are occasionally and easily obtained. These real-time actual benchmarks provide a degree of confidence in the modelling which can be communicated with the QoS data as an estimated error. Therefore, if a storage system is using a different model to another storage system, or a storage system is giving increasingly inaccurate data, the storage vendor can be informed. The storage system could then be re-benchmarked if necessary.

The configuration of the performance modelling block 118 according to a second version will now be described with reference to FIG. 8. The second version of the model 400 is also suitable for use in the performance modelling unit 118. The model 400 is designed to predict ahead the performance of the storage resource 102 based on the current resource profile.

The second version of the model 400 uses an alternative method to model the storage components 106 and calculates the behaviour of the storage resource 102. In the second version of the model 400, the access patterns of SLAs themselves are modelled.

Figure 8:
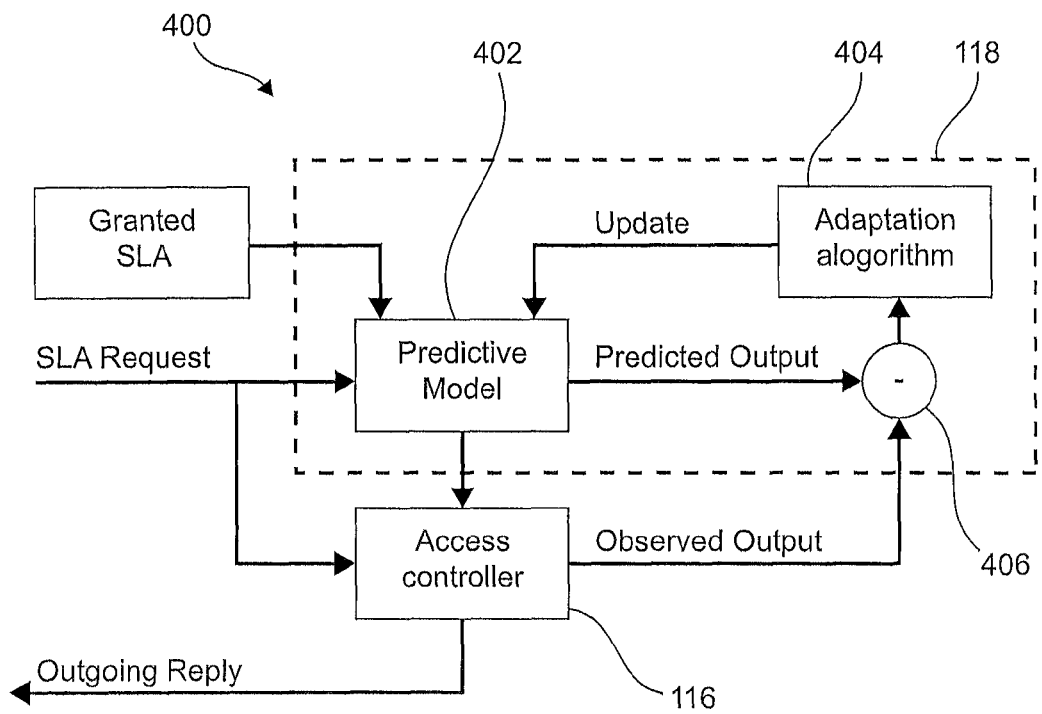
FIG. 8 is a schematic diagram of a second version of the model suitable for use in a performance modelling unit forming part of the storage controller of FIG. 3.

FIG. 8 is a block diagram showing the components of the performance modelling block 118 according to the second version of the model 400. The performance modelling block 118 comprises a predictive modelling block 402, an adaptation algorithm block 404 and a difference block 406. The performance modelling block 118 interacts with the access control block 116 and storage manager 114 in a feedback loop. Again, the model 400 comprises two stages—an initial "burn in" phase and an adaptive model.

Figure 9:
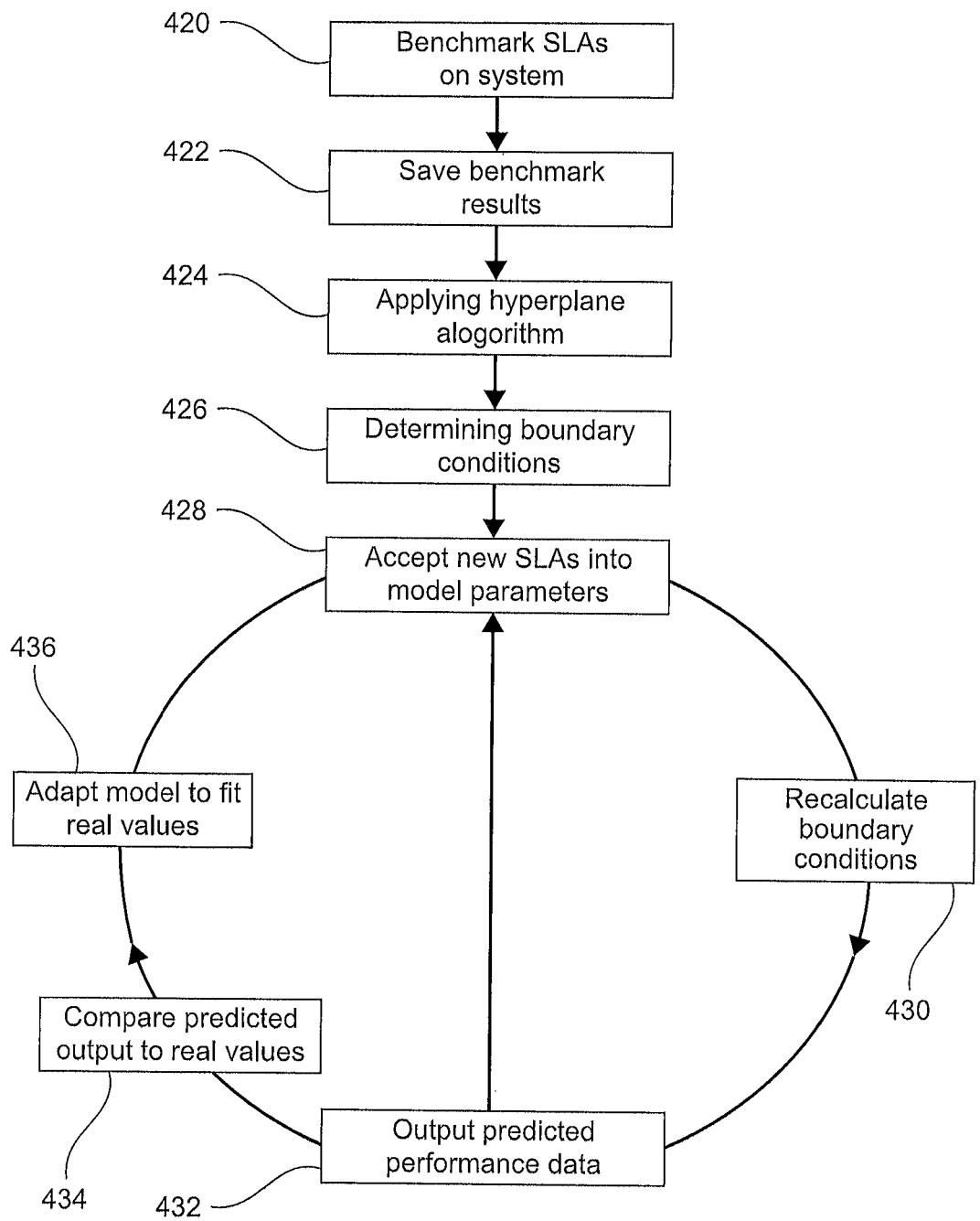
FIG. 9 is a flowchart illustrating the operation of the second version of the modelling structure used by the performance modelling unit of FIG. 4.

The operation of the model 400 will now be described with reference to FIG. 9.

i) Burn in Phase

Step 420: Benchmark SLAs

When the storage system is initialised, a benchmarking process is initiated which simulates a range of possible SLAs and their interactions. Each SLA has a plurality of measurable characteristics, for example, the required latency, bandwidth, read speed, write speed and data storage capacity. A number of different SLAs would be benchmarked on the storage resource 102 during initialisation. The method then proceeds to step 422.

Step 422: Storing the Benchmark Results

Figure 10:
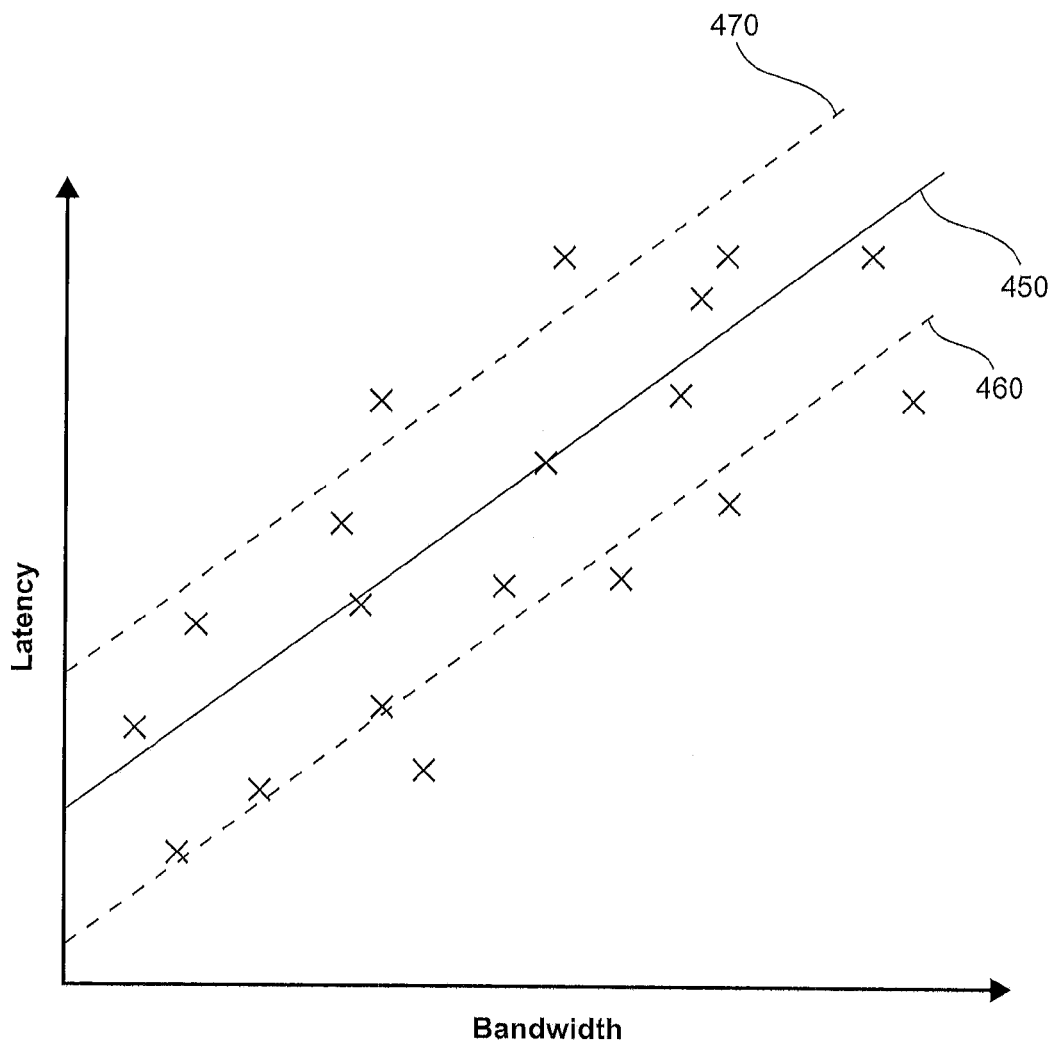
FIG. 10 is an illustrative graph showing bandwidth as a function of latency for a plurality of SLAs having access to the electronic data store of FIG. 2.

The results of step 422 stored in a multidimensional data space in the predictive modelling block 402 as initial conditions for the performance modelling. Each SLA would be represented as a vector of variables in this data space. A simple example of this data space is shown in FIG. 10. FIG. 10 is an example of a graph showing possible variables which may form part of the SLA data space. The graph shows read bandwidth as a function of latency in arbitrary units, and the different SLAs are plotted as points (crosses). Only two data parameters are shown in FIG. 10 for brevity; however, the model may have significantly more dimensions than shown in FIG. 10, and individual SLAs will be plotted as points in the hyperdimensional data space. The method then proceeds to step 424.

Step 424: Applying Hyperplane Algorithm

Once the data points representing the SLAs have been plotted, a hyperplane search/interpolation algorithm is applied to the data by the predictive modelling block 402. Note that, in the example of FIG. 10, only two data parameters are shown, so the results of the algorithm are represented as a straight line 450. However, for higher dimensionality, the results of the algorithm will be represented as a hyperplane (i.e. a multidimensional plane).

The algorithm provides a best-fit measure of the spread of data points from the SLAs run on the model which is defined by the best-fit value 450.

Step 426: Determining Boundary Conditions

Additionally, acceptable variation from the best-fit value 450 is defined by boundaries 460, 470, thus determining boundary conditions. Once the data store 100 is operating and receiving SLAs, a new SLA can be agreed if it fell within the boundaries 460, 470 in the data space. A new SLA would be rejected if it fell outside this boundary. Note that, in this case, the SLA would be rejected not because the system could physically meet the demands of the SLA, but because the parameters of the SLA are such that it may prove difficult to meet when interacting with other systems.

Once the benchmarking "burn in" process is complete and the storage resource 102 is operating with live connections having agreed SLAs, the adaptive, real-time model operates.

ii) Adaptive Model

Step 428: Accept New SLAs into Model Parameters

Taking the "burn-in" data from the initialisation routing, the predictive modelling block 402 would then accept "real world" data from SLAs accepted onto the storage resource 102 in use. Therefore, data representing the performance and interaction between the SLAs agreed on the data store 100 can be fed back into the predictive modelling block 402 to improve its accuracy.

Step 430: Recalculate Boundary Conditions

An important aspect is that the storage controller 104 must not accept a new SLA which will force an existing SLA on the storage resource 102 to be broken. Therefore, the predictive modelling block 402 must, in effectively real-time, calculate the interactions between SLAs and update the boundaries 460, 470 within which a new SLA could be accepted onto the system. This enables the usage to be predicted.

Based on the number of users connected to the data store 100, the bandwidth consumed and the storage resources remaining, the values of the boundaries 460, 470 will change. Consequently, the ranges of SLA values which can be accepted as part of a new request will correspondingly change. The model then proceeds to step 432.

Step 432: Output Predicted Performance Data

The predicted performance data can then be used by the access controller 116 and storage manager 114 to grant or deny new SLAs access to the storage resource 102. The model 400 can then proceed immediately back to step 428 and continue in a cycle. Alternatively, additional steps could be performed every cycle, or one in a predetermined number of cycles. If the additional steps are to be performed, the method proceeds to step 434.

Step 434: Compare Predicted Output to Actual Values

Actual "real world" data obtained from the storage resource 102 via the access controller 116 could be compared with the modelled data from the predictive modelling block 402 (FIG. 8). This is done by the difference block 406 which calculates the difference between the above two parameters. The results are then passed to the adaptation algorithm block 404. The method then proceeds to step 436.

Step 436: Adapt Model to Fit Real Values

After obtaining the data generated in step 434, the adaptation algorithm block 404 then modifies the parameters of the predictive modelling block 402 to best fit the modelled data to measurable real world data. The parameters of the predictive modelling block 402 are thus amended to be more accurate. The method can then proceed back to step 428 and continue in an operational cycle.

The alternative model 400 could be used in place of the earlier described model 300, as a variation. Further variations may be used—for example, the model need not perform a burn in and may simply rely upon real-time data acquired by a server or storage manager.

Variations of the above embodiments will be apparent to the skilled person. The precise configuration of hardware and software components may differ and still fall within the scope of the present invention. For example, the data store 100 may not use SLAs and instead may communicate connection parameters using different protocols.

A different predictive model may also be used to those disclosed herein. For example, the model may not have an "adaptive" phase and may be entirely predetermined prior to initialisation of the data store. Such a pre-defined model could be created using theoretical parameters and loaded onto the system prior to initialisation. Alternatively, the model may have no prior determination phase and may operate, entirely "on the fly".

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method comprising:
receiving, at a storage controller, a request from a client computer to establish a connection to a data storage resource for data transfer between the client computer and the data storage resource, the request comprising a service level agreement including at least one quality of service parameter of the requested data transfer connection;
obtaining performance information on the data storage resource based on real-time current data and a predictive model, the predictive model comprising virtual storage units that represent individual storage components within the data storage resource, each of the virtual storage units having a dynamically assigned number of operating states including an operational state, a reconstruction state, and a failover state; and
granting the request to establish a connection for data transfer in response to determining, based on the performance information, both:
a) the data storage resource has sufficient capability to meet the at least one quality of service parameter; and
b) meeting the at least one quality of service parameter will not violate any quality of service parameters of previously agreed service level agreements for existing data transfer connections of other client computers on the data storage resource.

2. A method according to claim 1, wherein the quality of service parameters comprise at least one of: storage capacity; bandwidth; latency or the type of data access.

3. A method according to claim 1, further comprising comparing quality of service parameter data of the previously agreed service level agreements with the quality of service parameters of the requested service level agreement from the client computer in order to determine whether the data storage resource can meet the at least one quality of service parameter of the request.

4. A method according to claim 3, further comprising determining whether the quality of service parameters fall within a range defined by the quality of service parameter data of the previously agreed service level agreements.

5. A method according to claim 1, wherein the predictive model uses heuristic methods.

6. A method according to claim 1, wherein the predictive model is operable to generate the performance information in real-time.

7. A method according to claim 1, wherein the data storage resource comprises at least one data storage component, the at least one data storage component comprising readable and writeable data storage media.

8. A method as claimed in claim 7, wherein the at least one storage component comprises a plurality of networked data storage devices.

9. A controller comprising:
a processor and a memory configured to:
receive requests from a client computer to establish a connection to a data storage resource for data transfer between the client computer and the data storage resource, the request comprising a service level agreement including at least one quality of service parameter of the requested data transfer connection;
obtain performance information on the data storage resource based on real-time current data and a predictive model, the predictive model comprising virtual storage units that represent individual storage components within the data storage resource, each of the virtual storage units having a dynamically assigned number of operating states including an operational state, a reconstruction state, and a failover state; and
based on the performance information, grant the request to establish a connection for data transfer if:
a) a data storage resource has sufficient capability to meet the at least one quality of service parameter; and
b) meeting the at least one quality of service parameter will not violate any quality of service parameters of previously agreed service level agreements for existing data transfer connections of other client computers on the data storage resource.

10. A controller according to claim 9, wherein the quality of service parameters comprise at least one of: storage capacity; bandwidth; latency or the type of data access.

11. A controller according to claim 9, wherein the processor is further configured to compare quality of service parameter data of the previously agreed service level agreements with the quality of service parameters of the requested service level agreement from the client computer in order to determine whether the data storage resource can meet the at least one quality of service parameter of the request.

12. A controller according to claim 11, wherein the processor is further configured to determine whether the quality of service parameters fall within a range defined by the quality of service parameter data of the previously agreed service level agreements.

13. A controller according to claim 9, wherein the predictive model uses heuristic methods.

14. A controller according to claim 9, wherein the predictive model is operable to generate the performance information in real-time.

15. A non-transitory computer readable medium having machine executable instructions that, when executed using a processor, perform a method according to claim 1.

16. A method according to claim 1, wherein the performance information describes at least predicted available bandwidth and predicted available latency.

17. A method according to claim 1, wherein the quality of service parameters comprise parameters describing the data transfer as being sequential or random.

18. A method according to claim 1 wherein the virtual storage units are modelled before the storage controller accepts requests to establish connections for storage.

19. A method according to claim 1 wherein the operating states include a random-access state, a sequential-access state, a sequential-access-read state, and a sequential-access-write state.

20. A method according to claim 1, wherein the determinations of whether the data storage resource has sufficient capability and whether meeting the at least one quality of service parameter will not violate any quality of service parameters of previously agreed service level agreements are performed independently of a current usage of the data storage resource.

* * * * *